United States Patent
Tormasov et al.

(10) Patent No.: US 10,600,417 B2
(45) Date of Patent: Mar. 24, 2020

(54) WEARABLE HUMAN INTERFACE DEVICES AND SYSTEMS

(71) Applicant: Acronis International GmbH, Schaffhausen (CH)

(72) Inventors: Alexander Tormasov, Moscow (RU); Serguei Beloussov, Costa Del Sol (SG); Stanislav Protasov, Moscow (RU)

(73) Assignee: Acronis International GmbH, Schaffhausen (CH)

(*) Notice: Subject to any disclaimer, the term of this patent is extended or adjusted under 35 U.S.C. 154(b) by 149 days.

(21) Appl. No.: 15/896,488

(22) Filed: Feb. 14, 2018

(65) Prior Publication Data

US 2018/0233148 A1    Aug. 16, 2018

Related U.S. Application Data

(60) Provisional application No. 62/459,705, filed on Feb. 16, 2017.

(51) Int. Cl.

| | |
|---|---|
| *G06F 3/03* | (2006.01) |
| *G10L 15/24* | (2013.01) |
| *G06F 3/01* | (2006.01) |
| *G10L 15/30* | (2013.01) |
| *G10L 15/26* | (2006.01) |
| *G10L 13/00* | (2006.01) |

(52) U.S. Cl.
CPC ............. *G10L 15/24* (2013.01); *G06F 3/017* (2013.01); *G10L 15/265* (2013.01); *G10L 15/30* (2013.01); *G10L 13/00* (2013.01)

(58) Field of Classification Search
CPC ........................................................ G06F 3/03
See application file for complete search history.

(56) References Cited

U.S. PATENT DOCUMENTS

| | | | |
|---|---|---|---|
| 2009/0048647 A1* | 2/2009 | Tingey | A61N 1/36014 607/62 |
| 2009/0309747 A1* | 12/2009 | Ghovanloo | A61F 4/00 340/686.1 |
| 2014/0342324 A1* | 11/2014 | Ghovanloo | G09B 5/06 434/185 |
| 2015/0301619 A1* | 10/2015 | Menon | A61F 4/00 345/156 |
| 2017/0052538 A1* | 2/2017 | Li | H04B 17/3913 |

* cited by examiner

*Primary Examiner* — Shreyans A Patel
(74) *Attorney, Agent, or Firm* — Arent Fox LLP; Michael Fainberg

(57) ABSTRACT

The present disclosure generally relates to the field of wearable human interface devices. In one aspect, a human interface device may comprise at least one housing configured to be worn by a user, comprising a transmitter configured to generate a wireless signal and a sensor configured to detect the wireless signal generated by the transmitter, a processing unit, communicatively linked to the sensor and configured to analyze the wireless signal detected by the sensor and calculate the position of a portion of the user wearing the at least one housing based on the wireless signal and a control unit, configured to perform an operation based upon the position of the portion of the user wearing the at least one housing.

20 Claims, 3 Drawing Sheets

WEARABLE HUMAN INTERFACE DEVICES AND SYSTEMS

CROSS-REFERENCE TO RELATED APPLICATION

This application claims benefit of U.S. Provisional Patent Application No. 62/459,705, entitled "Wearable Human Interface Devices and Systems" which was filed on Feb. 16, 2017, the contents of which is incorporated herein by reference.

FIELD OF TECHNOLOGY

The present disclosure generally relates to the field of wearable human interface devices ("HIDs"), and more specifically, to devices, systems and methods that allow a user to control or communicate with an electronic device based upon the movement or position of the user's tongue and/or jaw.

BACKGROUND

Consumer electronic devices, such as cell phones, tablets and other portable devices have become ubiquitous in recent years, with many consumers carrying multiple small electronic devices with them simultaneously. Portability is indeed an important feature for many consumers, as evidenced by the modern trend towards increasingly smaller, thinner, and lighter electronic devices. However, portability typically comes at a high cost in the sense that the smaller size of these devices reduces the amount of screen space and dedicated buttons available as an interface for user input.

This lack of input options is a notable limitation. For example, high-end cell phones are currently available which have more processing power than entire desktop computer systems sold only a few years ago. However, this additional processing power is limited to an extent by the lack of meaningful interface peripherals. While a user may theoretically be capable of pairing a keyboard or other hardware-based input device with their cell phone, such peripherals are often not available. As a result, application developers cannot presume that a wide range of input devices will be available when developing software. The availability of additional interface options would expand the usefulness of these devices by allowing for new applications that take advantage of these additional or non-traditional means of receiving user input.

Hardware manufacturers and software developers have proposed various solutions to the interface problem, though these solutions are often expensive or impractical. For example, there have been multiple attempts over the years to introduce handheld mouse-like peripherals which can provide three-dimensional positioning and motion data, allowing a user to provide input by gestures. Cell phone and tablet peripherals have also been developed, e.g., peripherals that generate a virtual keyboard on a hard surface using lasers or other light sources, such that a user's keystrokes can be detected based upon disruptions of the beam path. In recent years, the cell phone industry has also invested heavily in speech recognition applications as an alternative to the virtual keyboard often used to provide input to a cell phone. Nevertheless, these solutions remain non-ideal because the peripherals noted above are often expensive, non-intuitive, and inaccurate as input devices. Speech recognition applications have become increasingly sophisticated over the last decade, though widespread adoption is limited to a large extent by the requirement of an active internet connection and data use associated with these applications (i.e., mobile phones typically transmit recorded speech to a remote server 111 for processing). Speech recognition is also non-ideal because it by definition requires sound as an input (i.e., it cannot be used as an input interface in situations where silence is necessary). As a result, there exists a need for additional options for input interfaces for consumer electronics devices, particularly non-traditional input devices that are compatible with smaller devices and which can be used across a wide range of scenarios (e.g., while a user is walking or stationary) and without any need for a flat surface as required by many traditional input devices.

The development of additional input interfaces for electronic devices would also be useful for other segments of the population outside of the consumer electronics demographic. For example, many elderly and disabled individuals suffer from partial paralysis and other conditions that create motor impairment, limiting their ability to use traditional interface devices such as a mouse and keyboard. For example, individuals suffering Parkinson's disease may lack sufficient coordination to efficiently utilize a keyboard. As a result, there exists an additional specific need in the art for additional interface options that would allow a paralyzed or otherwise motor-impaired individual to interact with electronic devices and other computer systems.

SUMMARY

The present disclosure provides an effective solution to the foregoing problems by providing HIDs that allow a user to wirelessly control or communicate with electronic devices and other computer systems. Other advances and contributions to the current state of the art will be further apparent to one of ordinary skill in view of the following description. In particular, the disclosure provides various HIDs, as well as related systems and methods, which may be used to control or communicate with electronic devices (e.g., mobile phones), kiosks, store displays, and other computer systems based upon the movement or position of the user's tongue and/or jaw as described in detail herein.

In a first exemplary aspect, a human interface device is disclosed, comprising at least one housing configured to be worn by a user, comprising: a transmitter configured to generate a wireless signal; and a sensor configured to detect the wireless signal generated by the transmitter; a processing unit, communicatively linked to the sensor and configured to analyze the wireless signal detected by the sensor and calculate the position of a tongue and/or jaw of the user wearing the at least one housing based on the wireless signal; a control unit, configured to perform an operation based upon the position of the tongue and/or jaw of the user wearing the at least one housing.

In some exemplary aspects, the wireless signal is generated by the transmitter at a radio, microwave, or ultrasonic frequency.

In some exemplary aspects, the human interface device comprises at least two housings, wherein the processing unit is communicatively linked to the sensor of each housing and configured to analyze the wireless signals detected by the at least two sensors.

In some exemplary aspects, the processing unit is configured to calculate the position of the tongue and/or the jaw of the user wearing the at least one housing using a machine learning algorithm.

In some exemplary aspects, the operation performed by the control unit comprises controlling at least one of: a) an electronic device; b) a mobile or wearable device; c) a smartphone, tablet or watch; and/or d) a kiosk.

In some exemplary aspects, the operation performed by the control unit comprises the generation of: a) synthesized or simulated speech by an electronic device, where the speech is generated in response to at least one specific movement or position of the user's tongue and/or jaw; b) electronic text by an electronic device, where the text is generated in response to at least one specific movement or position of the user's tongue and/or jaw.

In some exemplary aspects, the human interface device further comprises a communication unit configured to interact with one or more electronic devices or kiosks configured to be controlled by the human interface device.

In some exemplary aspects, the communication unit is configured to interact with the one or more electronic devices or kiosks using a wireless, infrared, near field communication or Bluetooth connection.

In some exemplary aspects, the communication unit is further configured to establish a wireless connection with the one or more electronic devices or kiosks which allows the human interface device to control the one or more electronic devices or kiosks.

In some exemplary aspects, the transmitter is configured to transmit the wireless signal towards a face of the user wearing the at least one housing.

In another exemplary aspect, a human interface system for controlling or communicating with an electronic device is provided, comprising a human interface device, comprising: at least one housing configured to be worn by a user, comprising: a transmitter configured to generate a wireless signal; and a sensor configured to detect the wireless signal generated by the transmitter; a processing unit, communicatively linked to the sensor and configured to analyze the wireless signal detected by the sensor and calculate the position of a tongue and/or jaw of the user wearing the at least one housing based on the wireless signal; a control unit, configured to perform an operation based upon the position of the tongue and/or jaw of the user wearing the at least one housing; and optionally, a signal enhancer configured to be worn by the user by placement on or in proximity to the tongue and/or jaw of the user.

In some exemplary aspects, the signal enhancer comprises a metal foil configured to be placed on or in proximity to the tongue of the user.

In some exemplary aspects, the human interface system comprises at least two housings, wherein the processing unit is communicatively linked to the sensor of each housing and configured to analyze the wireless signals detected by the at least two sensors.

In some exemplary aspects, the human interface system comprises at least one human interface device configured according to any of the exemplary aspects described herein.

In another exemplary aspect, a method for controlling or communicating with an electronic device is provided, comprising providing a human interface device comprising at least one housing configured to be worn by a user, wherein the housing further comprises a transmitter and a sensor; generating a wireless signal, by the transmitter; receiving the wireless signal, by the sensor; analyzing the wireless signal detected by the sensor; calculating a position of a tongue and/or jaw of the user wearing the at least one housing based on the wireless signal; and controlling or communicating with the electronic device based upon the position of the tongue and/or jaw of the user wearing the at least one housing.

In some exemplary aspects, the method comprises providing a human interface device according to any of the preceding claims.

The above simplified summary of an exemplary aspect serves to provide a basic understanding of the disclosure. This summary is not an extensive overview of all contemplated aspects, and is intended to neither identify key or critical elements of all aspects nor delineate the scope of any or all aspects of the disclosure. Its sole purpose is to present one or more aspects in a simplified form as a prelude to the more detailed description of the disclosure that follows. To the accomplishment of the foregoing, the one or more aspects of the disclosure include the features described and particularly pointed out in the claims. Moreover, it is understood that the individual limitations of elements of any of the disclosed methods, systems and software products may be combined to generate still further aspects without departing from the spirit of the present disclosure and the concepts described herein.

BRIEF DESCRIPTION OF THE DRAWINGS

The accompanying drawings, which are incorporated into and constitute a part of this specification, illustrate one or more exemplary aspects of the present disclosure and, together with the detailed description, serve to explain their principles and implementations.

DETAILED DESCRIPTION

Figure 1:
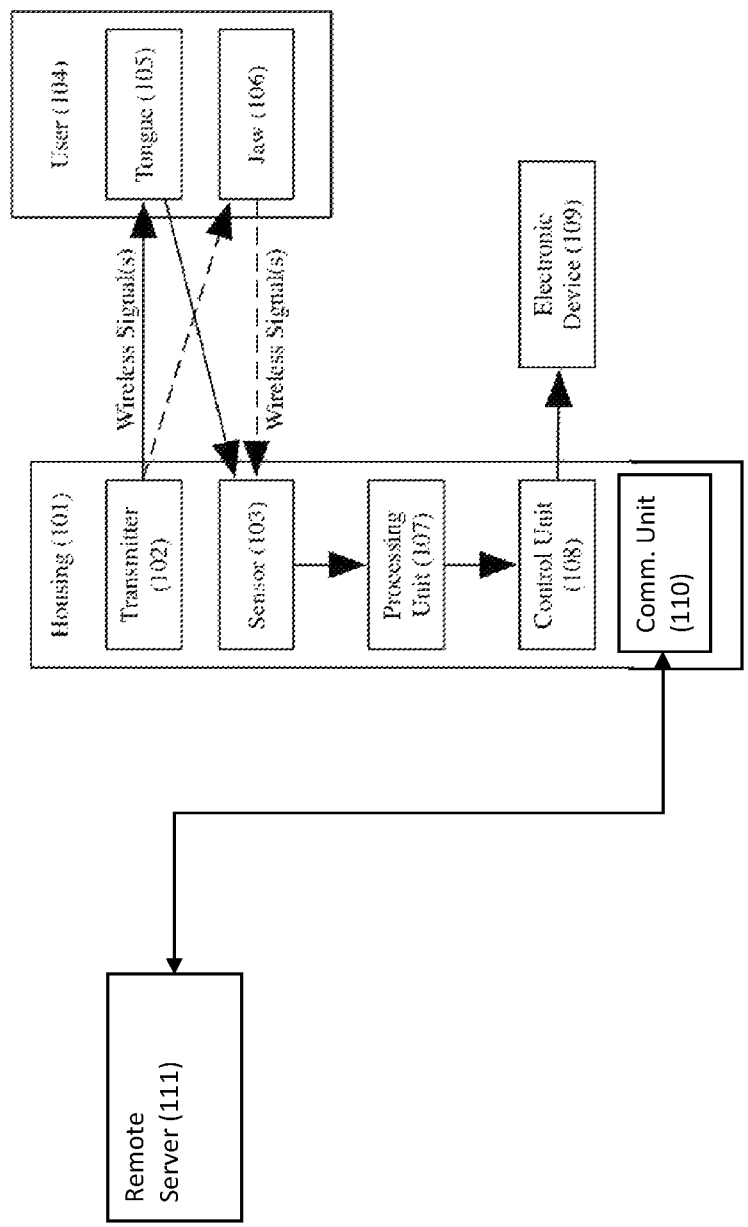
FIG. 1 is a block diagram illustrating a system for controlling or communicating with an electronic device according to an exemplary aspect.

Various aspects are now described with reference to the drawings, wherein like reference numerals are used to refer to like elements throughout. In the following description, for purposes of explanation, numerous specific details are set forth in order to promote a thorough understanding of one or more aspects. It may be evident in some or all instances, however, that any aspect described below can be practiced without adopting the specific design details described below. In other instances, well-known structures and devices are shown in block diagram form in order to facilitate description of one or more aspects. The following presents a simplified summary of one or more aspects in order to provide a basic understanding of the aspects. This summary is not an extensive overview of all contemplated aspects, and is not intended to identify key or critical elements of all aspects nor delineate the scope of any or all aspects.

As described herein, devices, systems and methods are disclosed controlling or communicating with an electronic device such as a smartphone, watch, kiosk, or store display. It is understood that such devices may also be particularly well-suited to control or communicate with speech synthesizers, and other assistive devices (e.g., by users that are partially paralyzed but able to move other portions of their body such as their tongue and/or jaw). As will be appreciated herein, such devices and systems provide multiple advantages over input methods known in the art. For example, the use of other portions of a user's body such as a user's tongue and/or jaw as a means of input provides interface options for individuals unable to physically control a mouse or keyboard, the two most common forms of computer input devices currently in use.

The presently disclosed devices may also be configured to operate silently (e.g., allowing use in situations where voice control or speech recognition may be prohibited). Human Interface Devices ("HIDs") according to the disclosure may also be manufactured as a comparatively small and portable form factor, and may be operated by a user while standing, moving, or sitting at a desk. In contrast, many input peripherals currently available for mobile electronic devices require that the user remain stationary and/or have access to a flat surface (e.g., keyboard and mouse-based interfaces).

As used herein, the term HID refers to any device, peripheral or accessory that interacts directly with, and takes input from, a human. HIDs typically direct input to a local processing module or a processing module of an electronic device or other computer system. Mouse and keyboard devices represent classic HIDs. Devices that receive audio or visual input from a human user may also qualify as an HID (e.g., a microphone and voice recognition software operating on a mobile phone). HIDs include standard input devices used to control electronic devices and other computer systems (e.g., a mouse and keyboard). However, HIDs also encompass nonstandard input devices designed for use by those with motor impairment and other physical disabilities.

FIG. 1 is a block diagram illustrating an HID system 100 for controlling or communicating with an electronic device according to an exemplary aspect. As shown by this illustration, a HID system 100 according to the disclosure may comprise at least one housing (101) that further comprises a transmitter (102), sensor (103), processing unit (107) and control unit (108). The transmitter (102) may emit a wireless signal such as a radiofrequency, microwave, hypersonic or any other signal capable of being used to obtain telemetry data which can be processed to detect a position or motion of a user's (104) tongue (105) and/or jaw (106). In the exemplary aspect shown by FIG. 1, the transmitter is configured to emit a wireless signal that the sensor (103) can use to detect the position and/or motion of both the tongue (105) and jaw (105) of the user (104). For example, the transmitter (102) may generate a signal that is emitted in the direction of a user's (104) face generally or specifically towards the tongue (105) and/or jaw (106), and then be reflected or refracted back towards a sensor (103) placed in the housing (101) adjacent to or in the proximity of the transmitter (102). In some exemplary aspects, the transmitter (102) and sensor (103) may be configured to detect the motion or presence of other facial features of a user, e.g., to establish one or more fixed reference points that can be used when calculating the position or motion of a user's (104) tongue (105) and/or jaw (106).

In some exemplary aspects, the transmitter (102) may generate a plurality of different frequencies or types or wireless signals, which may be particularly useful for distinguishing motion and position data for the user's (104) tongue (105) and/or jaw (106). Furthermore, in some aspects a HID system 100 according to the disclosure may comprise multiple housings (101), each comprising a discrete transmitter (102), sensor (103), processing unit (107) and control unit (108). In still further aspects, a system may comprise multiple housings (101) but with some overlap with respect to shared components (e.g., multiple housings (101) may share a single sensor (103) or processing unit (107). The housing or housing (101) used to hold or mount the transmitter (102), sensor (103) and other components described herein may take any form suitable for a given implementation. For example, the housing (101) may be attached to or mounted on a hat or headband, vest, armband, or any other type of clothing or wearable article.

Returning to the illustrated exemplary aspect, it is shown that the sensor (103) detects wireless signals that were generated by the transmitter (102) and refracted or reflected off of portions of the user, for example, the tongue (105) and/or jaw (106) of the user (104), and then passes this data to a processing unit (107). The processing unit (107) uses this data to calculate the position and/or motion of the portions of the user, such as the tongue (105) and/or jaw (106) of the user (104). In some aspects, the sensor (103) is configured to detect wireless signals that were generated by the transmitter (102) in real-time or at a rate that is substantially close to real-time. In other aspects, the sensor (103) is configured to poll for wireless signals at a particular rate or in response to a given trigger (e.g., the sensor (103) may be configured to activate/deactivate at the same time as the transmitter (102) in order to conserve battery power).

In some exemplary aspects, the sensor (103) is configured to detect multiple frequencies or types of wireless signals. In some exemplary aspects, the sensor (103) is configured to detect one or more ultrasonic frequencies. In other exemplary aspects, a HID according to the disclosure may include one or more housings (101) having a plurality of sensors (103) with different sensors tuned to detect specific frequencies or types of wireless signals.

In some exemplary aspects, systems according to the disclosure comprise a HID and a signal enhancer worn or positioned on or near the portion of the user being manipulated. For example, when the tongue (105) and/or jaw (106) of the user (104) is used, a signal enhanced is worn or positioned near the tongue (105) and/or jaw (106) of the user (104). The signal enhancer may comprise a metal strip or sheath, or any other device or structure suitable for enhancing the detection by the sensor (103) of wireless signals reflected or refracted off of the portion of the user such as the tongue (105) and/or jaw (106) of the user (104).

The processing unit (107) may use any algorithms or methods suitable to determine or otherwise infer the position and/or motion of the user (104) based on the detected wireless signals. In some exemplary aspects, the processing unit (107) may employ a machine learning algorithm.

In some exemplary aspects, the machine learning algorithm may be based on a supervised learning model. In some exemplary aspects, the model is prepared through a training process in which the processing unit (107) is required to make predictions and is corrected when those predictions are wrong, with the training process continuing until the model achieves a desired level of accuracy on the training data.

In some exemplary aspects, the machine learning algorithm may be based on an unsupervised learning model whereby input data is not labeled and does not have a known result. In some exemplary aspects, a model is prepared by deducing structures present in the input data. Such structures may be used, e.g., to extract general rules, to systematically reduce redundancy, or to organize data by similarity.

In some exemplary aspects, the machine learning algorithm may be based on a semi-supervised learning model whereby input data is a mixture of labeled and unlabeled examples. In some exemplary aspects, the model must learn the structures to organize the data as well as make predictions.

The processing unit (107) may calculate the position and/or motion of the tongue (105) and/or jaw (106) of the user (104) locally. Alternately, in some aspects the processing unit (107) may offload some or all of the processing to a remote server 111. In some aspects, the housing (101) includes a communication unit suitable to establish a connection between the processing unit (107) and the remote server 111 in order to facilitate remote processing. In some exemplary aspects, the processing unit (107) may comprises two or more sub-processors or processing modules, each configured to process a particular type or frequency of wireless signal.

In some exemplary aspects, the processing unit (107) may be configured to directly or indirectly communicate with another nearby or otherwise local user device (e.g., a mobile phone) in order to offload some or all of the signal processing. In such cases, the processing unit (107) may be configured to establish a wireless network and communicate directly with the user device. Alternatively, in some aspects the housing (101) may comprise a communication unit suitable to establish a wireless connection between the processing unit (107) and the remote processor in order to facilitate remote processing.

The specific process and subcomponent used by the processor (107) to calculate the position and/or motion of the tongue (105) and/or jaw (106) of the user (104) will ultimately vary based upon the given implementation. In some exemplary aspects, the calculation may be based on a plurality of sensor (103) readings comprising one or more types of wireless signal or wireless signals generated by multiple transmitters (102).

As illustrated by the exemplary example of FIG. 1, the processing unit (107) may transmit the calculated position and/or motion of the user's (104) tongue (105) and/or jaw (106) to a control unit (108). The control unit functions as an interface for one or more electronic devices (109), other computer systems, or functionality within the HID system 100, allowing the position and/or motion data to be used as an input to control the electronic device (109), other computer systems, or the HID system 100 itself. In some exemplary aspects, the control unit (108) comprises a software application or driver that communicates with an electronic device (109) or other system over a wired or wireless network. In other exemplary aspects, the control unit may comprise hardware configured to establish a wireless connection with the electronic device (109) being controlled.

Control in the present context may comprise a variety of different operations and forms of interaction. In some exemplary aspects, control comprises interaction with or selection of options from an interface provided by the electronic device (109). For example, a user (104) may be able to select options from a graphical user interface provided by the electronic device (109) using the HID. In other exemplary aspects, control may be direct physical control of the electronic device (109) such as moving a cursor provided on a screen of the electronic device (109) or a direction and/or speed of a physically mobile electronic device (e.g., steering a wireless drone device). In other exemplary aspects, the control unit interacts with electronic components of a kiosk, store display, or showroom of a retail store or other location.

In still further exemplary aspects, the operation performed by the control unit comprises the generation of synthesized or simulated speech by an electronic device, wherein the speech is generated in response to at least one specific movement or position of the user's tongue and/or jaw. In other exemplary aspects, electronic text may be generated by an electronic device, wherein the text is generated in response to at least one specific movement or position of the user's tongue and/or jaw. In such aspects the HID may be particularly useful for individuals suffering from medical conditions that limit their ability to communicate verbally or otherwise speak fluently, as the present systems may be used to determine tongue and jaw motions associated with particular words and sounds that the user (104) is incapable of properly articulating.

Figure 2:
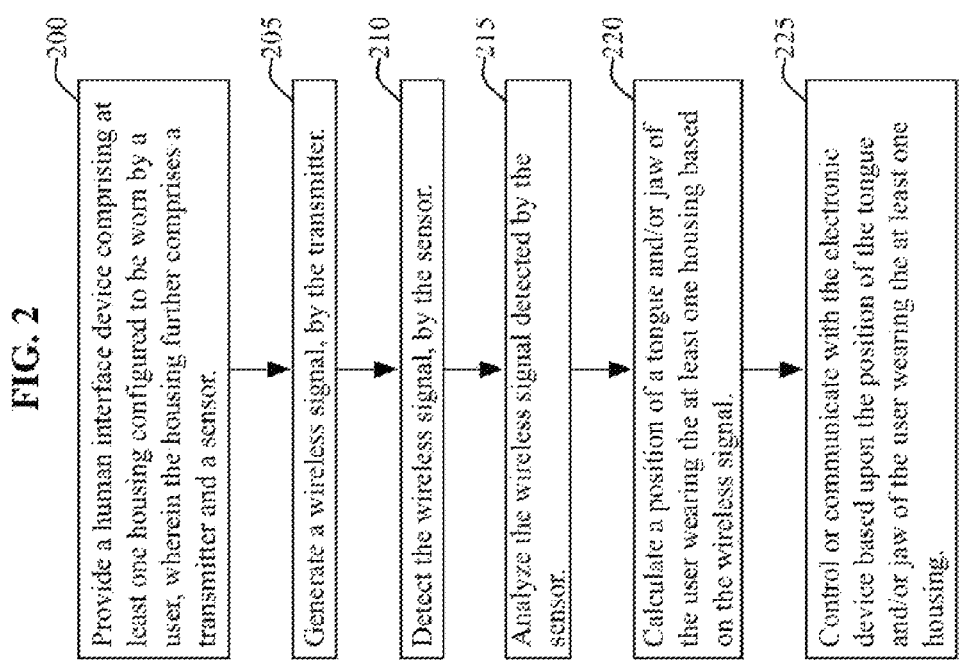
FIG. 2 is a flowchart illustrating an exemplary aspect of a method for controlling or communicating with an electronic device according to the present disclosure.

FIG. 2 illustrates a method for controlling or communicating with an electronic device according to one exemplary aspect of the disclosure. In a first step, an HID is provided which comprises at least one housing configured to be worn by a user, wherein the housing further comprises a transmitter and a sensor (200). The transmitter then generates a wireless signal (205), which is detected by the sensor (210), typically after being reflected or refracted by a user's tongue and/or jaw. The wireless signal detected by the sensor is then analyzed (215), typically by a processing unit as described above, which calculates a position of a tongue and/or jaw of the user based on the detected wireless signal (220). Finally, the position of the tongue and/or jaw of the user is used as an input to control or communicate with an electronic device (225).

In some exemplary aspects, methods according to the disclosure may be further modified to include any of the additional components and steps described herein in the description of devices and systems provided herein. Such modifications are readily understood in light of the present disclosure.

Figure 3:
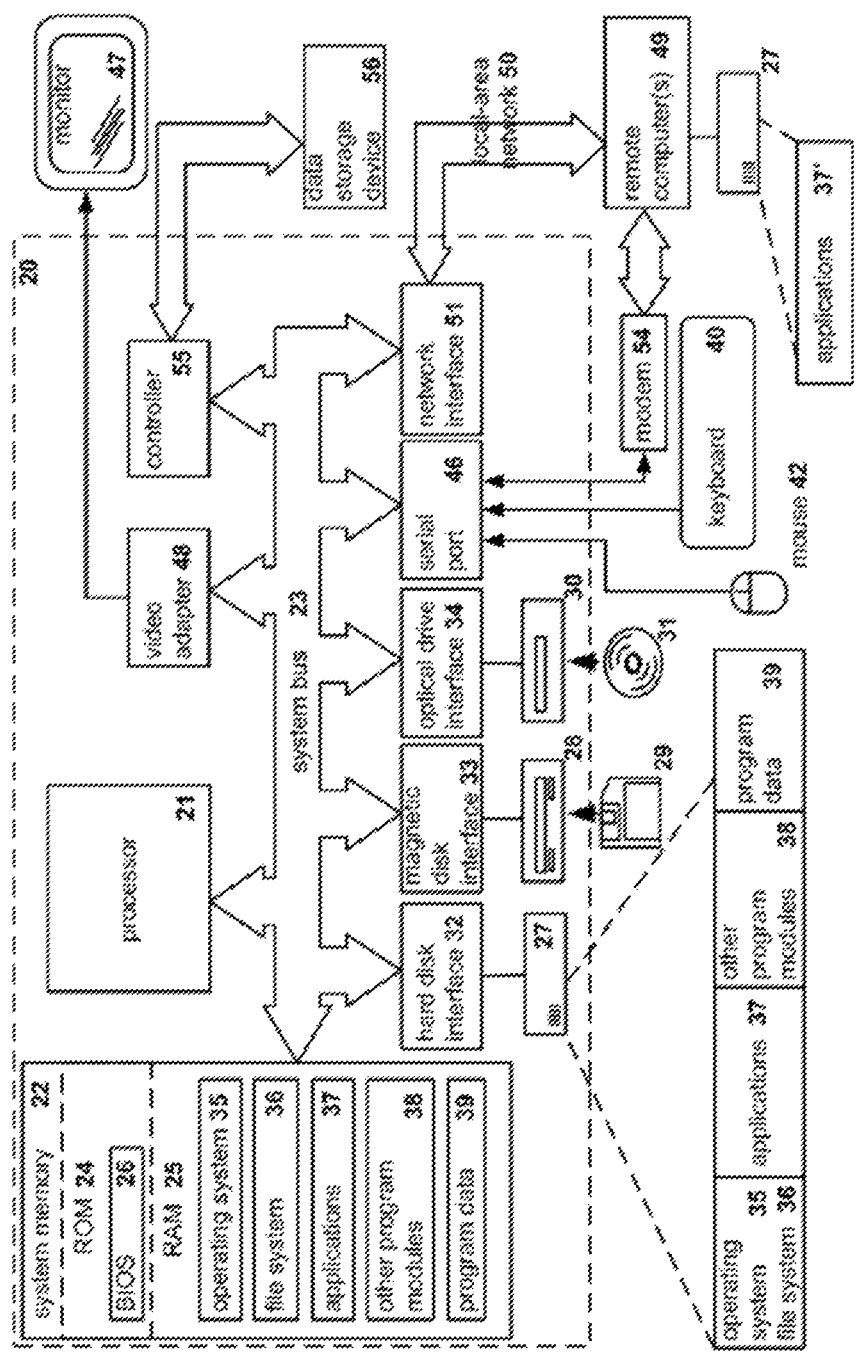
FIG. 3 illustrates an example of a general-purpose computer system with which the disclosed systems and methods (e.g., the exemplary aspects illustrated by FIGS. 1 and 2) can be implemented.

Finally, FIG. 3 illustrates an example of a general-purpose computer system (which may be a personal computer or a server) with which the disclosed systems and methods can be implemented according to some exemplary aspects. It should be appreciated that the detailed general-purpose computer system can correspond to the processing unit (107) or the electronic device (109) described above with respect to FIG. 1.

As shown in FIG. 3, the computer system 20 includes a central processing unit 21, a system memory 22 and a system bus 23 connecting the various system components, including the memory associated with the central processing unit 21. The system bus 23 is realized like any bus structure known from the prior art, including in turn a bus memory or bus memory controller, a peripheral bus and a local bus, which is able to interact with any other bus architecture. The system memory includes read only memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate within a network environment, using a network connection to one or more remote computers 49. The remote computer (or computers) 49 are also personal computers or servers having the majority or all of the aforementioned elements in describing the nature of a personal computer 20, as shown in FIG. 3. Other devices can also be present in the computer network, such as routers, network stations, peer devices or other network nodes.

Network connections can form a local-area computer network (LAN) 50, such as a wired and/or wireless network, and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules, such as Bluetooth.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted as by one of ordinary skill in the art in light of the teachings and guidance presented herein. Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the concepts disclosed herein.

The invention claimed is:

1. A human interface device comprising:
   at least one housing configured to be worn by a user, comprising:
   a transmitter configured to emit a plurality of different frequencies in a direction of a portion of the user; and
   a sensor configured to detect the plurality of different frequencies emitted by the transmitter;
   a processing unit, communicatively linked to the sensor and configured to analyze the plurality of different frequencies detected by the sensor and calculate the position of the portion of the user wearing the at least one housing based on the plurality of different frequencies;
   a control unit, configured to perform an operation based upon the position of the portion of the user wearing the at least one housing.

2. The human interface device of claim 1, wherein the portion of the user comprises one or more of a tongue and a jaw of the user.

3. The human interface device of claim 1, comprising at least two housings, wherein the processing unit is communicatively linked to a plurality of sensors of each housing and configured to analyze the plurality of different frequencies detected by the plurality of sensors, wherein the plurality of sensors of the at least one housing comprises the sensor and wherein each respective sensor of the plurality of sensors detects a respective frequency of the plurality of different frequencies.

4. The human interface device of claim 1, wherein the processing unit is configured to calculate the position of the portion of the user wearing the at least one housing using a machine learning algorithm.

5. The human interface device of claim 1, wherein the operation performed by the control unit comprises controlling or interacting with at least one of:
   a) an electronic device;
   b) a mobile or wearable device;
   c) a smartphone, tablet or watch; and/or
   d) a kiosk or store display.

6. The human interface device of claim 1, wherein the operation performed by the control unit comprises the generation of:
   a) synthesized or simulated speech by an electronic device, wherein the speech is generated in response to at least one specific movement or position of the user's tongue and/or jaw;

b) electronic text by an electronic device, wherein the text is generated in response to at least one specific movement or position of the user's tongue and/or jaw.

7. The human interface device of claim 1, further comprising a communication unit configured to interact with one or more electronic devices or kiosks configured to be controlled by the human interface device.

8. The human interface device of claim 7, wherein the communication unit is configured to interact with the one or more electronic devices or kiosks using a wireless, infrared, near field communication or Bluetooth connection.

9. The human interface device of claim 7, wherein the communication unit is further configured to establish a wireless connection with the one or more electronic devices or kiosks sufficient to allow the human interface device to control the one or more electronic devices or kiosks.

10. The human interface device of claim 1, wherein the transmitter is configured to transmit the plurality of different frequencies towards a face of the user wearing the at least one housing.

11. A human interface system for controlling or communicating with an electronic device, comprising:
a human interface device, comprising:
at least one housing configured to be worn by a user, comprising:
a transmitter configured to emit a plurality of different frequencies in a direction of at least one of a tongue and jaw of the user; and
a sensor configured to detect the plurality of different frequencies emitted by the transmitter;
a processing unit, communicatively linked to the sensor and configured to analyze the plurality of different frequencies detected by the sensor and calculate the position of the at least one of the tongue and jaw of the user wearing the at least one housing based on the plurality of different frequencies;
a control unit, configured to perform an operation based upon the position of the at least one of the tongue and jaw of the user wearing the at least one housing; and
a signal enhancer configured to be worn by the user by placement on or in proximity to the at least one of the tongue and jaw of the user.

12. The human interface system of claim 11, wherein the signal enhancer comprises a metal foil configured to be placed on or in proximity to the tongue of the user.

13. The human interface system of claim 11, comprising at least two housings, wherein the processing unit is communicatively linked to a plurality of sensors of each housing and configured to analyze the plurality of different frequencies detected by the plurality of sensors, wherein the plurality of sensors of the at least one housing comprises the sensor and wherein each respective sensor of the plurality of sensors detects a respective frequency of the plurality of different frequencies.

14. The human interface system of claim 11, comprising a human interface device according to any of the preceding claims.

15. A method for controlling or communicating with an electronic device, comprising:
providing a human interface device comprising at least one housing configured to be worn by a user, wherein the housing further comprises a transmitter and a sensor;
calculating a position of a portion of the user wearing the at least one housing, based on a plurality of different frequencies emitted, by the transmitter, in a direction of the portion; and
controlling or communicating with the electronic device based upon the position of the portion of the user wearing the at least one housing.

16. The method of claim 15, further comprising providing a human interface device according to any of the preceding claims.

17. The method of claim 15, wherein the signal enhancer comprises a metal foil configured to be placed on or in proximity to the tongue of the user.

18. The method of claim 15, wherein the portion of the user comprises one or more of a tongue and a jaw of the user.

19. The method of claim 15, further comprising:
generating the plurality of different frequencies, by the transmitter;
detecting the plurality of different frequencies, by the sensor;
analyzing the plurality of different frequencies detected by the sensor, wherein calculating the position of the portion of the user is based on the analyzed plurality of different frequencies.

20. The method of claim 15, wherein the electronic device is one or more of a mobile or wearable device, a computer system, and a kiosk.

* * * * *